(12) United States Patent
Chen

(10) Patent No.: US 11,174,201 B1
(45) Date of Patent: Nov. 16, 2021

(54) CARBON STORAGE USING ASH, SEAWATER, AND ALKALI ACTIVATOR AS A NON-CEMENT-BASED BUILDING MATERIALS

(71) Applicant: The University of North Carolina at Charlotte, Charlotte, NC (US)

(72) Inventor: Shen-En Chen, Charlotte, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 136 days.

(21) Appl. No.: 16/660,921

(22) Filed: Oct. 23, 2019

Related U.S. Application Data

(60) Provisional application No. 62/749,729, filed on Oct. 24, 2018, provisional application No. 62/771,800, filed on Nov. 27, 2018.

(51) Int. Cl.
| | |
|---|---|
| *C04B 28/00* | (2006.01) |
| *C04B 22/00* | (2006.01) |
| *C04B 18/06* | (2006.01) |
| *C04B 111/00* | (2006.01) |

(52) U.S. Cl.
CPC .......... *C04B 28/006* (2013.01); *C04B 18/061* (2013.01); *C04B 22/0026* (2013.01); *C04B 2111/00637* (2013.01)

(58) Field of Classification Search
CPC . C04B 18/061; C04B 22/0026; C04B 28/006; C04B 2111/00637
See application file for complete search history.

(56) References Cited

U.S. PATENT DOCUMENTS 7,846,250 B2 * 12/2010 Barlet-Gouedard ... C09K 8/467
106/600

OTHER PUBLICATIONS

Adam et al, "Strength, sorptivity and carbonation in blended OPC-GGBS, alkali activated slag, and fly ash based geopolymer concrete" DOI: 10.1201/9780203859926.ch91. (Year: 2016).*
Rees et al, "The Role of Solid Silicates on the Formation of Geopolymers derived from coal ash", International Symposium of Research Students on Material Science and Engineering, pp. 1-13. (Year: 2004).*
Ridha et al "Impact of wet supercritical CO2 injection on fly ash geopolymer cement under elevated temperatures for well cement applications", Journal of Petroleum Exploration and Production Technology 10:243-247. (Year: 2020).*

* cited by examiner

*Primary Examiner* — Anthony J Green
(74) *Attorney, Agent, or Firm* — Bradley C. Fach

(57) ABSTRACT

Carbon dioxide and ash are two major waste by-products from coal fire production. Presented herein is are methods, material, and devices for storing carbon using high ash-content building material. The idea is to generate materials with commercial values to offset the cost for carbon capture. Ash with alkali activator (geopolymer) concrete has been studied extensively for its superior performance (higher strength) than ordinary Portland cement (OPC) concrete. However, most geopolymer concrete needs energy input in the forms of pressure and heat, which in turn are usually based on electricity produced through power plants.

1 Claim, 3 Drawing Sheets

CARBON STORAGE USING ASH, SEAWATER, AND ALKALI ACTIVATOR AS A NON-CEMENT-BASED BUILDING MATERIALS

RELATED APPLICATION DATA

This application claims priority to US provisional application Nos. 62/749,729 filed Oct. 24, 2018 and 62/771,800 filed on Nov. 27, 2018. Both of which are hereby incorporated by reference.

FIELD OF THE INVENTION

This patent specification relates to the field of building materials and in particular to non-cement based building materials.

BACKGROUND

Geopolymer concrete is known in the art. Geopolymer concrete has been used extensively as bricks or blocks for construction. The term "geopolymer" was first introduced in 1979 by Davidovits. Davidovits explained that geosynthesis is the science of manufacturing artificial rock at a temperature below 100° C. in order to obtain natural characteristics (hardness, longevity, and heat stability) of rock. Geopolymers can be thus viewed as mineral polymers resulting from geochemistry or geosynthesis. Modern alumino-silicate based works can be traced to 1930s when alkali oxides were used for reaction with slag to test their suitability for use in Portland cement. A rapid hardening binder by slag activation was reported in 1940 by Belgian scientists [Purdon (1940)]. In 1974, Davidovits and Legrand (1974) filed a patent on 'Siliface process' which involved the use of NaOH, quartz, kaolinite, and water. The 'geopolymer' was an alumino-silicate gel, where the silicon and aluminium are tetrahedrally-bonded through sharing oxygen atoms forming the basic monomer unit is a sialate (O—Si—O—Al—O) carrying excess negative charge which occurs when the Al3+(of the source material such as clay) dissolved in alkaline liquid. Geopolymer concrete is considered much "greener" than OPC (Ordinary Portland Cement) because it does not include cement, which produces significant amount of $CO_2$ during its manufacturing.

It is possible to use extensive amount of ash in geopolymer concrete. The fast reaction between alkali and ash does not allow time for growth of well-structured crystal (like a typical Zeolite). Hence, they are called as Zeolite precursors (not actual Zeolite). The final product of geopolymerization is an amorphous—semi crystalline cementitious material. Geopolymer not only provides performance comparable to OPC in many applications, but has additional advantages, including abundant raw material resources, rapid development of mechanical strength, good durability, superior resistance to chemical attack, ability to immobilize contaminants, and significantly reduced energy consumption and greenhouse gas emissions [Shi et al., (2006); Dimas et al., (2009); He et al., (2012)].

The other closely related materials would be OPC or other cement-based construction materials. Because of the potential of fixation of carbon through carbonation and its popularity as construction materials, OPC has been suggested as a carbon storage material. Modern day concrete also use extensive amount of ash. Both ash and carbon dioxides are by-products of coal fire power generation.

BRIEF SUMMARY OF THE INVENTION

Carbon dioxide and ash are two major waste by-products from coal fire production. Presented herein are methods, material, and devices for storing carbon using high ash-content building material. The idea is to generate materials with commercial values to offset the cost for carbon capture. Ash with alkali activator (geopolymer) concrete has been studied extensively for its superior performance (higher strength) than ordinary Portland cement (OPC) concrete. However, most geopolymer concrete needs energy input in the forms of pressure and heat, which in turn are usually based on electricity produced through power plants. To be completely sustainable, the inventors have developed an innovative, highly porous, geopolymeric concrete with sea water only with CO2 curing. This material is suggested for simultaneous depletion of ash, carbon dioxide and possible furnace slag from iron manufacturing. Unlike typical geopolymeric concrete, the making of the suggested material does not require high temperature nor pressure. The product has higher strength than porous OPC concrete and absorbed carbon dioxide at a faster rate.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
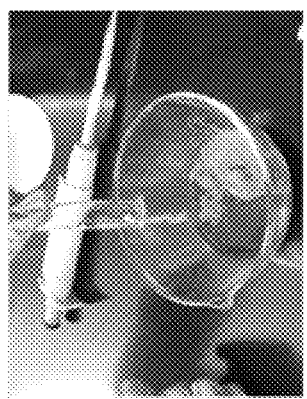
FIG. 1 depicts an example of some of the methods for a Material Mixing Procedure to create a material in accordance with some embodiments presented herein.
Figure 1:
Figure 1:
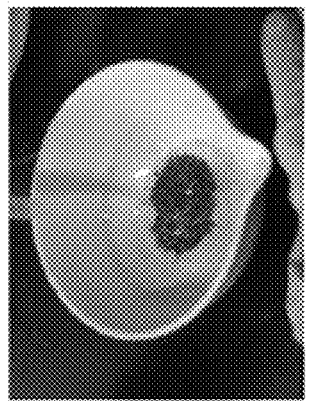
Figure 1:
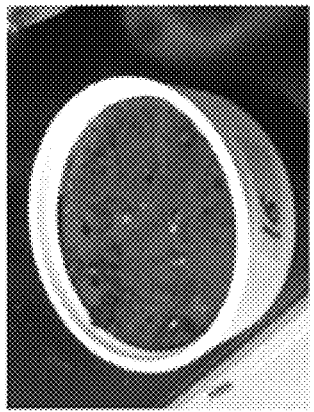
Figure 1:
Figure 1:

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

In preferred embodiments, the system presented herein comprises an alkali activator (mix of NaOH, Na2SiO3 and sea water), ash, GGBFS to make concrete building material. In our design, no additional energy input (heat or pressure) is being applied. The molar concentration of the activator is critical and suggestions range from 2 M Na2SO4 to 16 M NaOH. Different combinations of bottom ash/fly ash/GGBFS can also be used to optimize the material design. This invention suggests the use of percolators such as aluminum powder to make the material porous, so that CO2 can flow through the material and form carbonates within the material. The carbon capture/entrap/sequester mechanism is by the formation of sodium carbonates. Using seawater has the advantage of providing additional sources of sodium for the formation of sodium carbonates.

Several attempts in making the right mix were conducted in the laboratory. Current accepted product consists of 6 M concentrated NaOH and 1.5 M Na2SiO3 and sea water as activator. Bottom ash, slag and metal shavings can be added to increase the strength of the mix. The proportion of percolating agent such as aluminum powder can be added to increase the porosity of the material. FIG. 1 shows the process of the manufacturing of ASAAC material.

Figure 2:
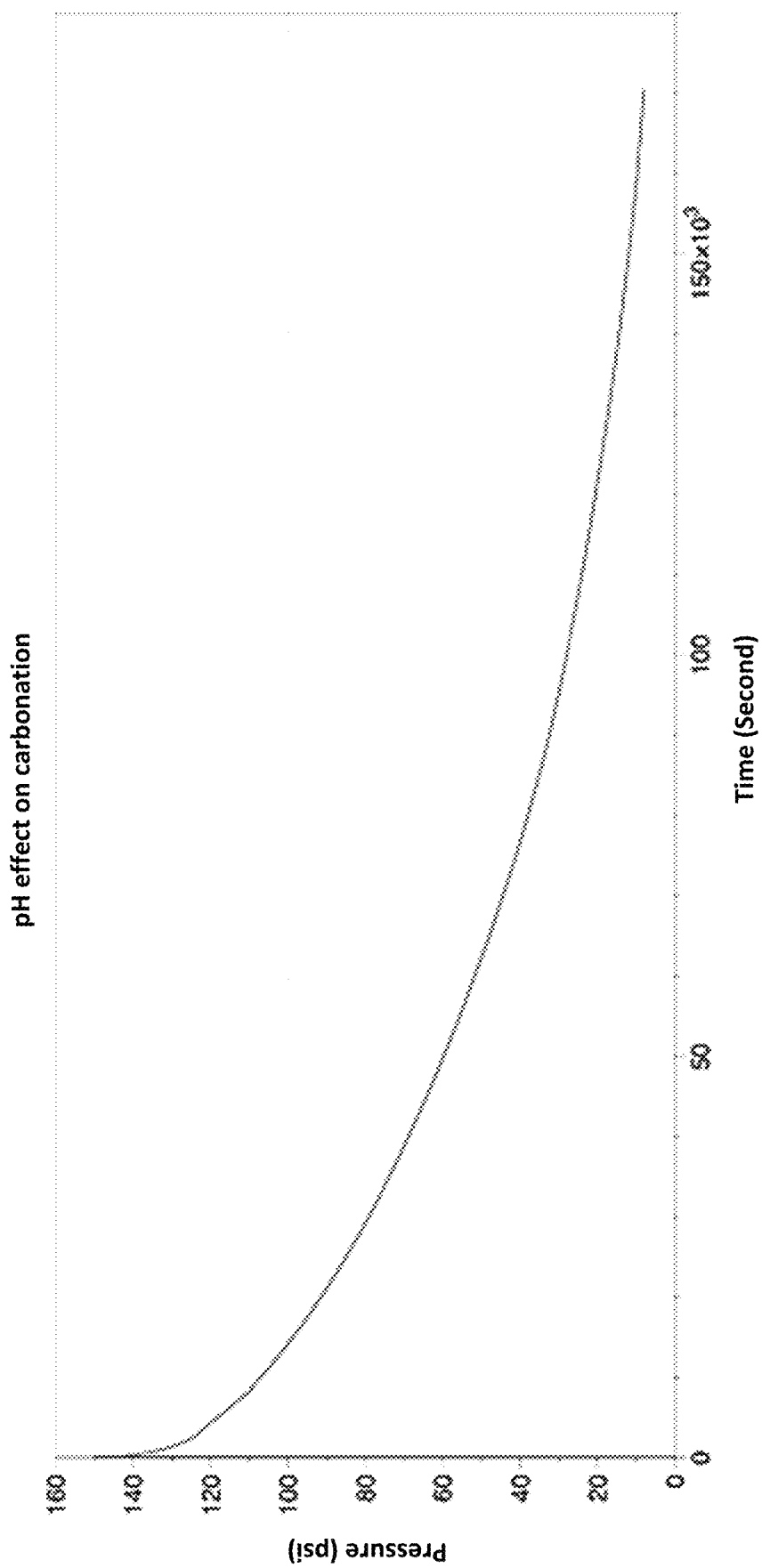
FIG. 2 illustrates Sorption of An Acid-Strong ACC (Ash Carbon Concrete).
Figure 3:
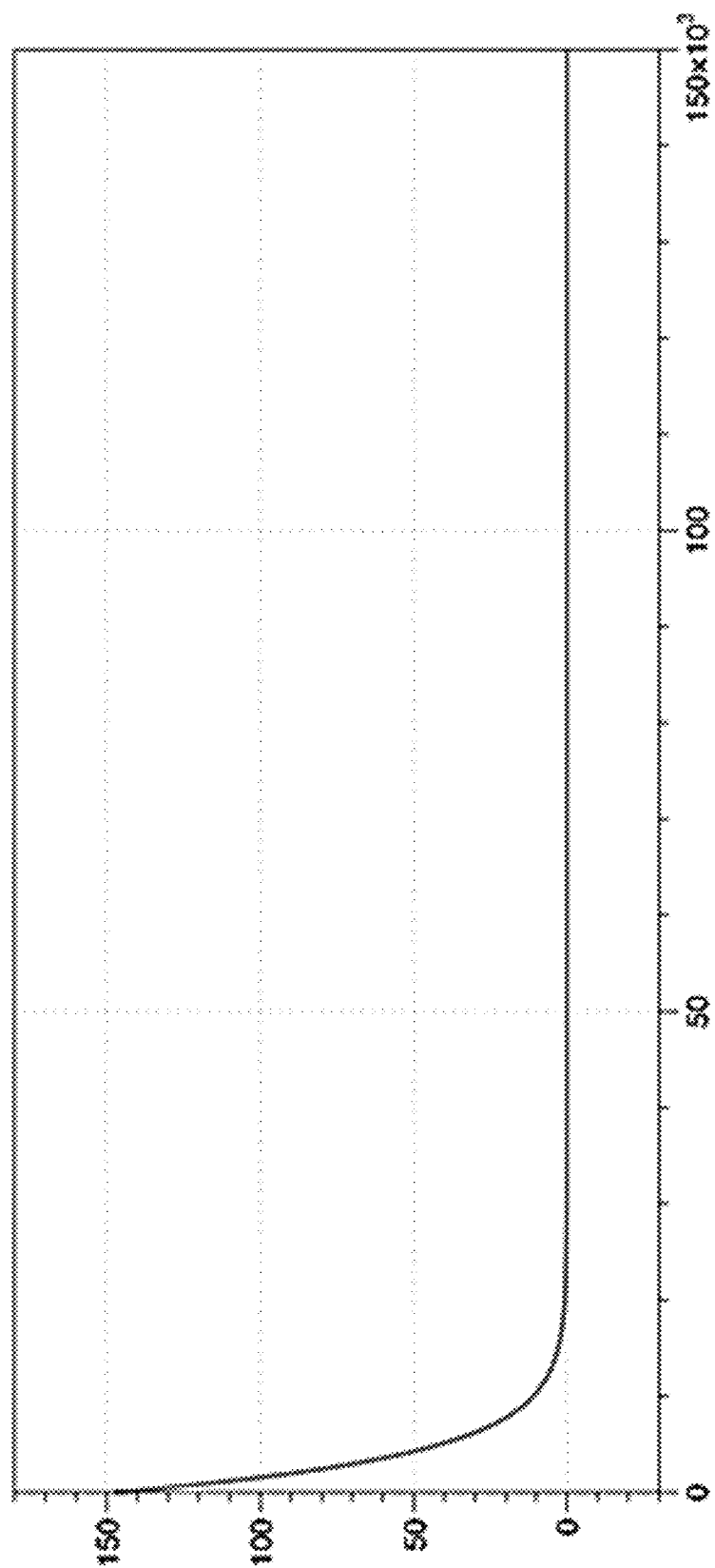
FIG. 3 illustrates Sorption of ASAAC (Ash Seawater Alkali Activated Concrete).

Carbon dioxide sorption test results show that by comparison, the ASAAC sorption is 10 times faster than the ACC, which can be accelerated by increasing the acidity (lowering of pH) of the material (FIGS. 2 and 3).

I claim:

1. A process for creating geopolymeric concrete, the process comprising:
    adding salt water to a mixture of geopolymer concrete;
    adding coal ash; and
    curing the mixture with CO2.

* * * * *